(12) United States Patent
Kust et al.

(10) Patent No.: US 6,227,263 B1
(45) Date of Patent: May 8, 2001

(54) FLUID DIVERTING ASSEMBLY

(76) Inventors: Terry Kust, 2502 37th St.; James T. Terp, 3211 41st St., both of Two Rivers, WI (US) 54241

( * ) Notice: Subject to any disclaimer, the term of this patent is extended or adjusted under 35 U.S.C. 154(b) by 0 days.

(21) Appl. No.: 09/497,908

(22) Filed: Feb. 4, 2000

(51) Int. Cl.[7] .................. B65B 1/04; B65B 3/04; B67C 3/02
(52) U.S. Cl. ................. 141/86; 141/97; 141/98; 184/106
(58) Field of Search .................. 141/86, 97, 98, 141/114; 184/1.5, 106; 248/155.5, 205.1, 206.5, 447; 224/924, 929; 222/108; 137/312

(56) References Cited

U.S. PATENT DOCUMENTS

| D. 321,062 | * | 10/1991 | Bonright | D26/140 |
| 4,098,398 | * | 7/1978 | Meyers | 206/223 |
| 5,099,872 | * | 3/1992 | Tarvin et al. | 137/312 |
| 5,276,596 | * | 1/1994 | Krenzel | 362/191 |

* cited by examiner

Primary Examiner—Timothy L. Maust

(57) ABSTRACT

A fluid diverting assembly for preventing the oil from the oil filter from running onto unwanted parts and surfaces includes a base assembly designed for removably coupling to a structure, a shaft extending from the base assembly, and a tray member coupled to an end of the shaft opposite the base assembly. The shaft is flexible for facilitating positioning of the tray member into a desired location by manipulation of the shaft.

8 Claims, 2 Drawing Sheets

FLUID DIVERTING ASSEMBLY

BACKGROUND OF THE INVENTION

1. Field of the Invention

The present invention relates to fluid diverting devices and more particularly pertains to a new fluid diverting assembly for preventing the oil from a vehicle oil filter from running onto other vehicle parts and surfaces.

2. Description of the Prior Art

The use of fluid diverting devices is known in the prior art. More specifically, fluid diverting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,655,624; U.S. Pat. No. 4,451,368; U.S. Pat. No. 4,913,813; U.S. Pat. No. 5,603,749; U.S. Pat. No. 4,929,356; and U.S. Pat. No. Des. 369,413.

While these devices fulfill their respective, particular objectives and requirements, the aforementioned patents do not disclose a new fluid diverting assembly. The inventive device includes a base assembly designed for removably coupling to a structure, a shaft extending from the base assembly, and a tray member coupled to an end of the shaft opposite the base assembly. The shaft is flexible for facilitating positioning of the tray member into a desired location by manipulation of the shaft.

In these respects, the fluid diverting assembly according to the present invention substantially departs from the conventional concepts and designs of the prior art, and in so doing provides an apparatus primarily developed for the purpose of preventing the oil from the oil filter from running onto unwanted parts and surfaces.

SUMMARY OF THE INVENTION

In view of the foregoing disadvantages inherent in the known types of fluid diverting devices now present in the prior art, the present invention provides a new fluid diverting assembly construction wherein the same can be utilized for preventing the oil from an oil filter from running onto other parts and surfaces when changing the oil of a vehicle.

The general purpose of the present invention, which will be described subsequently in greater detail, is to provide a new fluid diverting assembly apparatus and method which has many of the advantages of the fluid diverting devices mentioned heretofore and many novel features that result in a new fluid diverting assembly which is not anticipated, rendered obvious, suggested, or even implied by any of the prior art fluid diverting devices, either alone or in any combination thereof.

To attain this, the present invention generally comprises a base assembly designed for removably coupling to a structure, a shaft extending from the base assembly, and a tray member coupled to an end of the shaft opposite the base assembly. The shaft is flexible for facilitating positioning of the tray member into a desired location by manipulation of the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fluid diverting assembly apparatus and method which has many of the advantages of the fluid diverting devices mentioned heretofore and many novel features that result in a new fluid diverting assembly which is not anticipated, rendered obvious, suggested, or even implied by any of the prior art fluid diverting devices, either alone or in any combination thereof.

It is another object of the present invention to provide a new fluid diverting assembly that may be easily and efficiently manufactured and marketed.

It is a further object of the present invention to provide a new fluid diverting assembly that is of a durable and reliable construction.

An even further object of the present invention is to provide a new fluid diverting assembly which is susceptible of a low cost of manufacture with regard to both materials and labor, and which accordingly is then susceptible of low prices of sale to the consuming public, thereby making such fluid diverting assembly economically available to the buying public.

Still yet another object of the present invention is to provide a new fluid diverting assembly which provides in the apparatuses and methods of the prior art some of the advantages thereof, while simultaneously overcoming some of the disadvantages normally associated therewith.

Still another object of the present invention is to provide a new fluid diverting assembly for preventing oil from an oil filter from running onto other parts and surfaces during an oil change.

Yet another object of the present invention is to provide a new fluid diverting assembly which includes a base assembly designed for removably coupling to a structure, a shaft extending from the base assembly, and a tray member coupled to an end of the shaft opposite the base assembly. The shaft is flexible for facilitating positioning of the tray member into a desired location by manipulation of the shaft.

Still yet another object of the present invention is to provide a new fluid diverting assembly that allows a user to be able to use the fluid diverting assembly on many different vehicles because of the assemblies flexibility.

Even still another object of the present invention is to provide a new fluid diverting assembly that prevents oil leakage on garage floors or driveways of customers, therefore creating better customer relations and eliminating false oil leak callbacks from customers after the oil change.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
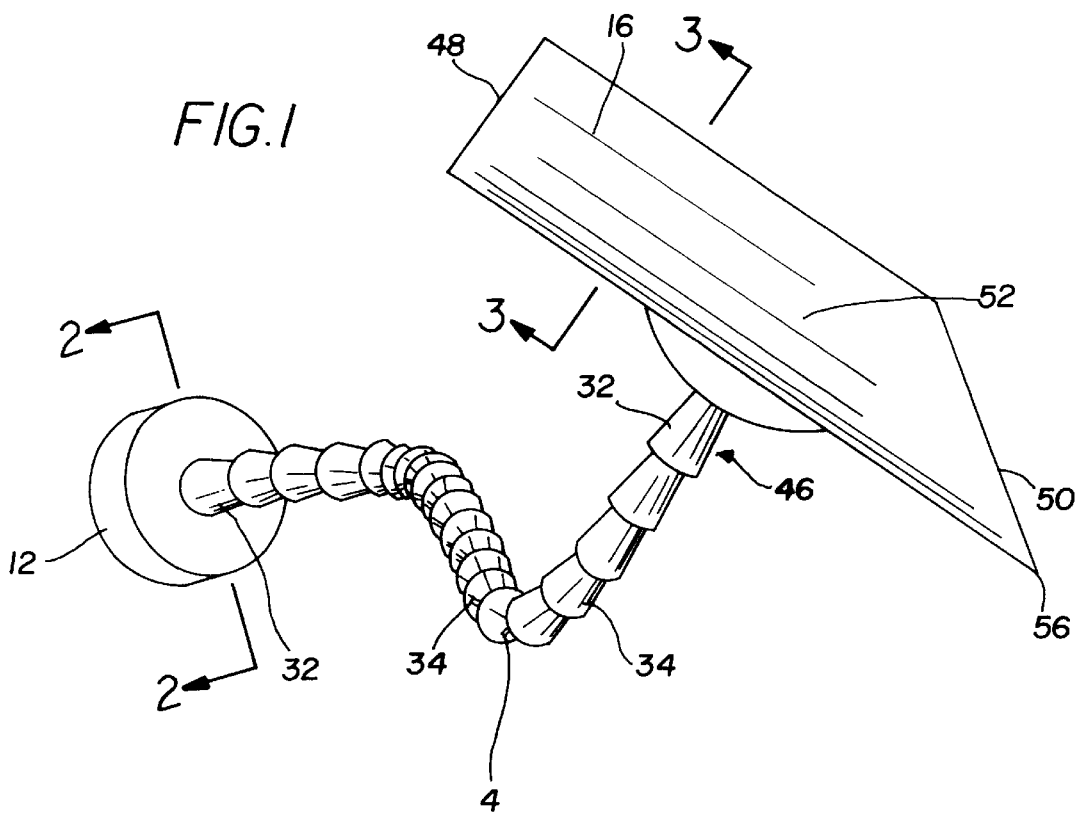
FIG. 1 is a perspective view of a new fluid diverting assembly according to the present invention.
Figure 2:
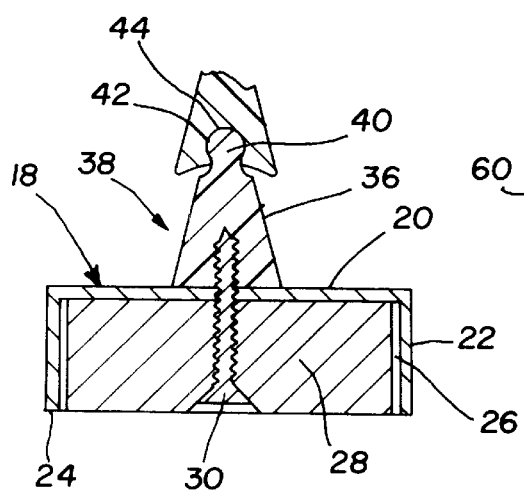
FIG. 2 is a cross-sectional view of the magnetic base taken along line 2—2 of FIG. 1.
Figure 3:
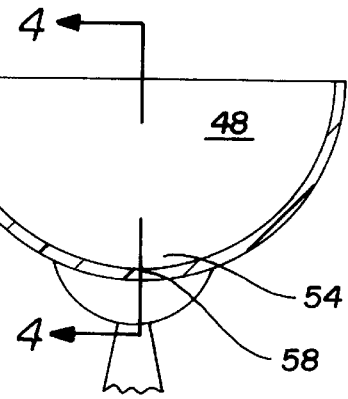
FIG. 3 is a side view of the fluid diversion tray of the present invention.
Figure 4:
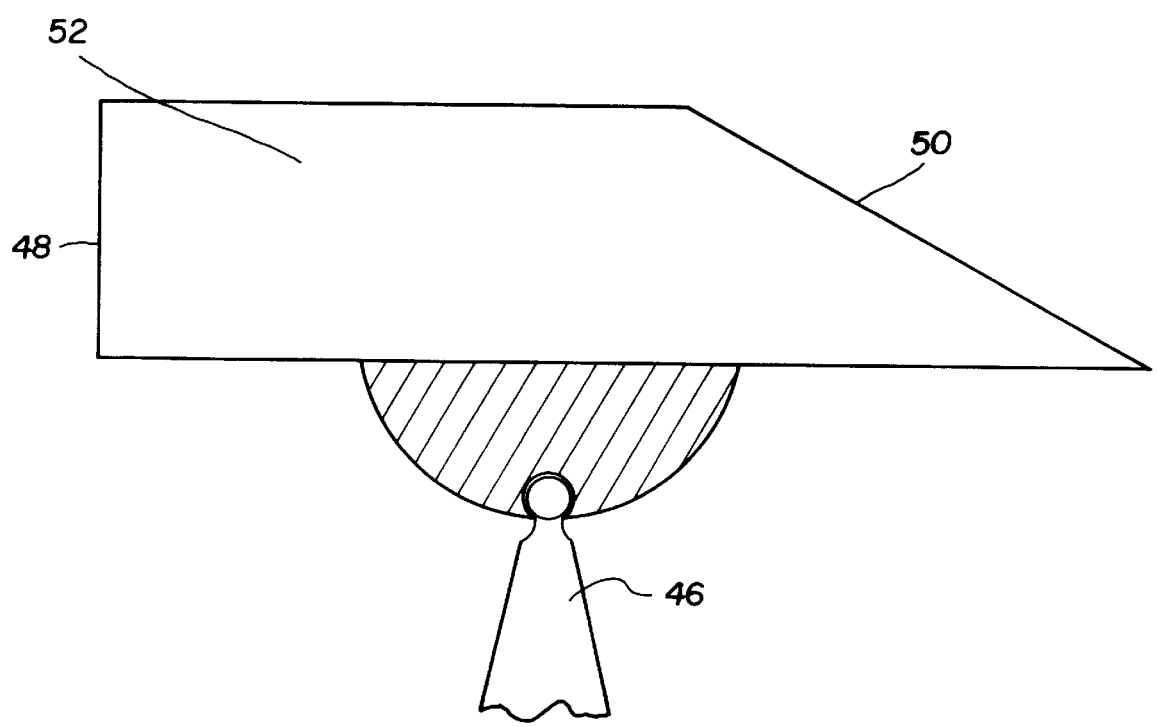
FIG. 4 is a cross-sectional view taken along line 4—4 of FIG. 3.

With reference now to the drawings, and in particular to FIGS. 1 through 4 thereof, a new fluid diverting assembly embodying the principles and concepts of the present invention and generally designated by the reference numeral 10 will be described.

As best illustrated in FIGS. 1 through 4, the fluid diverting assembly 10 generally includes a base assembly 12 designed for removably coupling to a structure. A shaft 14 extends from the base assembly 12. A tray member 16 is coupled to an end of the shaft 14 opposite the base assembly 12. The shaft 14 is flexible for facilitating positioning of the tray member 16 into a desired location by manipulation of the shaft 14.

The base assembly 12 further includes a cover member 18 that includes a top wall 20 and a perimeter wall 22 extending outwardly from an outer perimeter edge 24 of the top wall 20 to define an open interior space 26. A magnet 28 is positioned in the open interior space 26 whereby the base assembly 12 is designed for magnetically coupling to a metal structure.

A connection member 30 extends through the magnet 28 and the top wall 20 of the cover member 18 whereby the magnet 28 is coupled to the cover member 18. In an embodiment, the shaft 14 is segmented and includes a pair of end segments 32 and a plurality of medial segments 34. A first one of the end segments 38 abuts the top wall 20 of the cover member 18. The connection member 30 extending into a bottom portion 36 of the first end segment 38 whereby the first end segment 38 is coupled to the base assembly 12.

Each of the medial segments 34 includes a rounded head portion 40 and a bottom portion 42. The bottom portion 42 of each medial segment 34 includes a socket 44. The head portion 40 of each the medial segments 34 is insertable into the socket 44 of an adjacently positioned medial segment 34 whereby the medial segments 34 are jointedly coupled to form a chain of medial segments 34. The first end segment 38 includes a rounded head portion 40 for coupling with a socket 44 at a first end of the chain of medial segments 34. A second one of the pair of end segments 46 includes a socket 44 for receiving a head portion 40 at a second end of the chain of medial segments 34. The second end segment 46 includes a rounded head portion 40 coupled to the tray member 16.

The tray member 16 includes a rear wall 48 that includes an arcuate edge 50. The tray member 16 further includes a fluid collection wall 52 that extends outwardly from the arcuate edge 50 to form a channel 54 such that the tray member 16 is designed for diverting the direction of travel of a liquid falling into the tray member 16. A distal edge 56 of the fluid collection wall 52 is curved such that a length of a bottom of the channel 58 along a longitudinal axis of the channel 54 is greater than a length of a top of the channel 60 taken parallel to the longitudinal axis of the channel 54.

In use, the fluid diverting assembly attaches to any metal underneath a vehicle. The flexible support allows the user to position the tray attached to the support underneath the oil filter before removal. This prevents oil from running onto undesired places.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fluid diverting assembly comprising:

a magnetic base assembly adapted for removably coupling to a structure;

a shaft extending from the base assembly;

a tray member coupled to an end of said shaft opposite said base assembly;

wherein said shaft is flexible and conformable to a selectable shape for facilitating positioning of said tray member into a desired location by manipulation of said shaft such that said tray member is supported in said desired location by said shaft; and said tray member including a rear wall, said rear wall having an arcuate edge, said tray member further having a fluid collection wall extending orthogonally outwardly from said arcuate edge to form a channel with said rear wall closing a first end of said channel and a second end of said channel being open such that said tray member is adapted for diverting the direction of travel of a liquid falling into said tray member out of said second end of said channel.

2. The fluid diverting assembly of claim 1, wherein said base assembly further comprises:

a cover member having a top wall and a perimeter wall extending outwardly from an outer perimeter edge of said top wall to define an open interior space; and a magnet positioned in said open interior space whereby said base assembly is adapted for magnetically coupling to a metal structure.

3. The fluid diverting assembly of claim 2, further comprising:

a connection member extending through said magnet and said top wall of said cover member whereby said magnet is coupled to said cover member.

4. The fluid diverting assembly of claim 1, further comprising:

said shaft being jointed and including a pair of end segments and a plurality of medial segments.

5. The fluid diverting assembly of claim 4, further comprising:

a first one of said end segments abutting a top wall of said cover member, a connection member extending into a bottom portion of said first end segment whereby said first end segment is coupled to said base assembly.

6. The fluid diverting assembly of claim 4, further comprising:

each said medial segment including a rounded head portion and a bottom portion, said bottom portion of each medial segment having a socket, said head portion of each said medial segment being insertable into said socket of an adjacently positioned medial segment whereby said medial segments are jointedly coupled to form a chain of medial segments;

said first end segment having a rounded head portion for coupling with a socket at a first end of said chain of medial segments; and a second one of said pair of end segments having a socket for receiving a head portion at a second end of said chain of medial segments, said second end segment having a rounded head portion coupled to said tray member.

7. The fluid diverting assembly of claim 1, further comprising:

a distal edge of said fluid collection wall being curved such that a length of a bottom of said channel along a longitudinal axis of said channel is greater than a length of a top of said channel taken parallel to said longitudinal axis of said channel.

8. A fluid diverting assembly comprising:

a base assembly adapted for removably coupling to a structure;

a shaft extending from the base assembly;

a tray member coupled to an end of said shaft opposite said base assembly;

wherein said shaft is flexible for facilitating positioning of said tray member into a desired location by manipulation of said shaft;

wherein said base assembly further includes
a cover member having a top wall and a perimeter wall extending outwardly from an outer perimeter edge of said top wall to define an open interior space,
a magnet positioned in said open interior space whereby said base assembly is adapted for magnetically coupling to a metal structure, and
a connection member extending through said magnet and said top wall of said cover member whereby said magnet is coupled to said cover member;

said shaft being segmented and including a pair of end segments and a plurality of medial segments;

a first one of said end segments abutting said top wall of said cover member, said connection member extending into a bottom portion of said first end segment whereby said first end segment is coupled to said base assembly;

each said medial segment including a rounded head portion and a bottom portion, said bottom portion of each medial segment having a socket, said head portion of each said medial segment being insertable into said socket of an adjacently positioned medial segment whereby said medial segments are jointedly coupled to form a chain of medial segments;

said first end segment having a rounded head portion for coupling with a socket at a first end of said chain of medial segments;

a second one of said pair of end segments having a socket for receiving a head portion at a second end of said chain of medial segments, said second end segment having a rounded head portion coupled to said tray member;

said tray member having a rear wall, said rear wall having an arcuate edge, said tray member further having a fluid collection wall extending outwardly from said arcuate edge to form a channel such that said tray member is adapted for diverting the direction of travel of a liquid falling into said tray member; and a distal edge of said fluid collection wall being curved such that a length of a bottom of said channel along a longitudinal axis of said channel is greater than a length of a top of said channel taken parallel to said longitudinal axis of said channel.

* * * * *